(12) United States Patent
Ikeuchi et al.

(10) Patent No.: US 8,489,976 B2
(45) Date of Patent: Jul. 16, 2013

(54) STORAGE CONTROLLING DEVICE AND STORAGE CONTROLLING METHOD (75) Inventors: Kazuhiko Ikeuchi, Kawasaki (JP); Mikio Ito, Kawasaki (JP); Hidejirou Daikokuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1076 days.

(21) Appl. No.: 12/071,512

(22) Filed: Feb. 21, 2008

(65) Prior Publication Data
US 2008/0201630 A1 Aug. 21, 2008

(30) Foreign Application Priority Data
Feb. 21, 2007 (JP) .................. 2007-040651

(51) Int. Cl.
*G06F 11/00* (2006.01)
(52) U.S. Cl.
USPC ......................................... 714/801
(58) Field of Classification Search
USPC ......................................... 714/801
See application file for complete search history.

(56) References Cited

U.S. PATENT DOCUMENTS

| | | | | |
|---|---|---|---|---|
| 5,768,296 A * | 6/1998 | Langer et al. ............... | 714/784 |
| 5,809,516 A | 9/1998 | Ukai et al. | |
| 6,985,996 B1 * | 1/2006 | Nagshain ............... | 711/114 |
| 6,993,701 B2 | 1/2006 | Corbett et al. | |
| 7,203,892 B2 | 4/2007 | Corbett et al. | |
| 2003/0051111 A1 | 3/2003 | Nakano et al. | |
| 2004/0158833 A1 * | 8/2004 | Dickson ............... | 718/103 |
| 2005/0108613 A1 * | 5/2005 | Kobayashi ............... | 714/770 |
| 2006/0069947 A1 * | 3/2006 | Takahashi et al. ............... | 714/6 |
| 2006/0101215 A1 | 5/2006 | Yuasa | |
| 2006/0143508 A1 | 6/2006 | Mochizuki et al. | |
| 2006/0288161 A1 * | 12/2006 | Cavallo ............... | 711/114 |
| 2008/0162806 A1 * | 7/2008 | Gopal et al. ............... | 711/114 |

FOREIGN PATENT DOCUMENTS

| | | |
|---|---|---|
| JP | 8-185275 | 7/1996 |
| JP | 9-244820 | 9/1997 |
| JP | 2003-122509 | 4/2003 |
| JP | 2003-233468 | 8/2003 |
| JP | 2006-134241 | 5/2006 |
| JP | 2006-171957 | 6/2006 |

OTHER PUBLICATIONS

Japanese Office Action dated Feb. 3, 2009 is corresponding Japanese Patent Application No. 2007-040651.

* cited by examiner

*Primary Examiner* — Scott Baderman
*Assistant Examiner* — Jigar Patel
(74) *Attorney, Agent, or Firm* — Staas & Halsey LLP (57) ABSTRACT

According to an aspect of an embodiment, a method of storing user data (UD) with parity data (PD) for correcting the UD in a storage apparatus comprising disk units, each of the disk units storing data in data blocks(DBs), each of the DBs storing the UD or associated PD and position information(PI) indicative of the location of the DBs, comprising: obtaining the UD, dividing the UD into UD blocks (UDBs) which are adapted to be stored in the DBs, and determining which UDBs are to be stored into which DBs, respectively; determining PI of the DBs for storing the UDBs; generating PD for a group of UDBs and associated PI by parity operation using a weighting function to the UDBs and the PI; determining PI for the PD for said group by modifying a part of the PD; and storing the group of the UDBs, associated PI, and the PD.

8 Claims, 8 Drawing Sheets

STORAGE CONTROLLING DEVICE AND STORAGE CONTROLLING METHOD

TECHNICAL FIELD

The present disclosure relates to a storage controlling device and a storage controlling method that generate two types of parity.

As existing art related to the present disclosure, in a type of storage control device used in a storage device such as RAID (Redundant Arrays of Inexpensive Disks) in which data redundancy is provided using two or more types of parity, mapping is defined so as to improve the performance of sequential read. Such a storage control device is described, for example, in Japanese Unexamined Patent Application Publication No. 2006-171957.

SUMMARY

According to an aspect of an embodiment, a method of storing user data with parity data for correcting the user data in a storage apparatus comprising a plurality of disk units, each of the disk units storing data in a plurality of data blocks, each of the data blocks storing a part of either the user data or associated parity data and position information indicative of the location of each of the data blocks, the method comprising: obtaining the user data, dividing the user data into a plurality of user data blocks which are adapted to be stored in the data blocks, and determining which user data blocks are to be stored into which data blocks, respectively; determining position information of each of the data blocks for storing the user data blocks; generating parity data for a group of user data blocks and associated position information by parity operation using a weighting function to the user data blocks and the position information; determining position information for the parity data for said group by modifying a part of the parity data by operation using a constant relating to the weighting function; and storing the group of the user data blocks, associated position information, and the parity data containing the position information obtained by modifying the part of the parity data into corresponding data blocks, respectively.

DESCRIPTION OF THE PREFERRED EMBODIMENTS

First, the configuration of an existing RAID device will be described.

Figure 1:
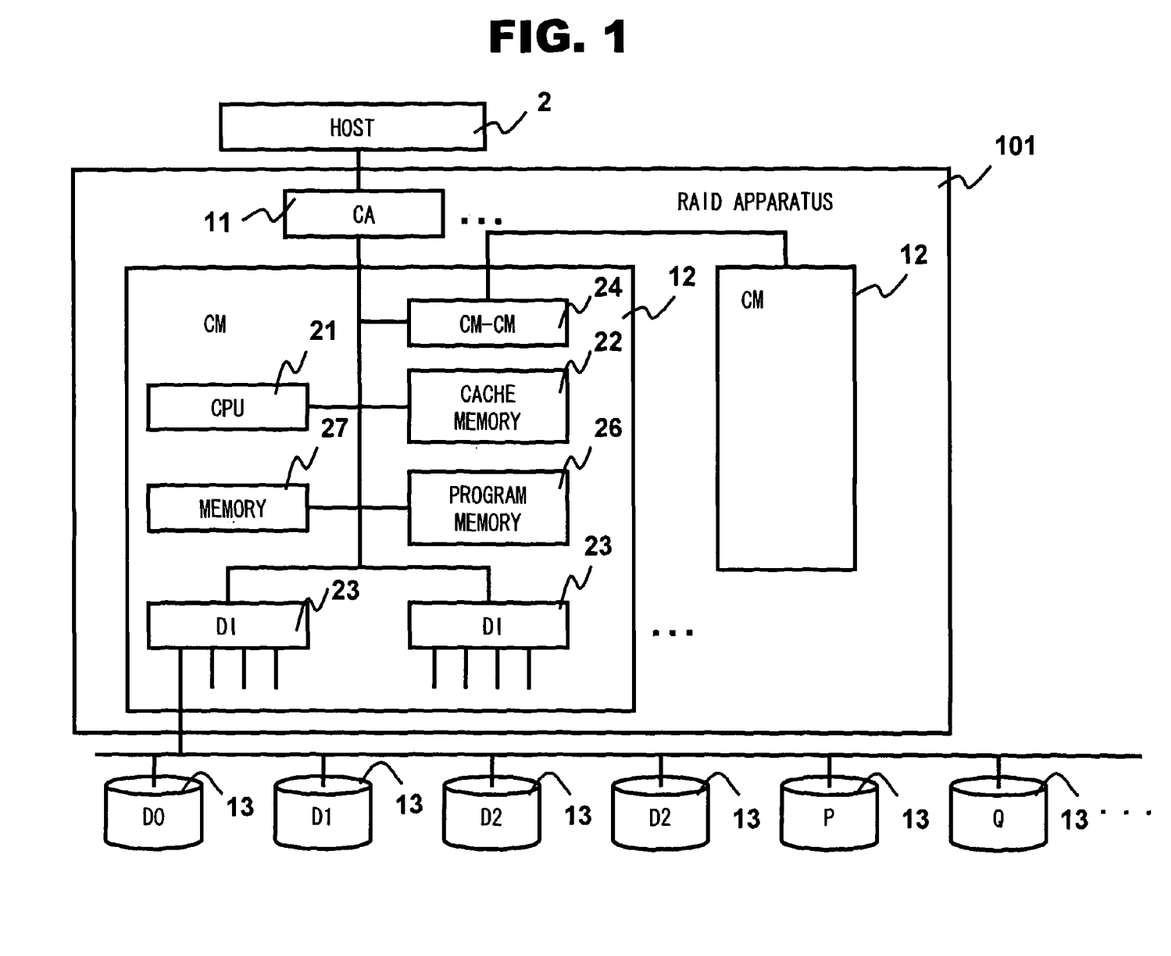
FIG. 1 is a block diagram showing an example configuration of an existing RAID device.

FIG. 1 is a block diagram showing an example configuration of an existing RAID device. A RAID device 101 includes a plurality of channel adaptors (CAs) 11, a plurality of controller modules (CMs) 12, and a plurality of disks 13. Each of the CMs 12 includes a central processing unit (CPU) 21, a cache memory 22, a disk interface (DI) 23, a CM-CM transferring unit (CM-CM) 24, a program memory 26, and a memory 27.

Each of the CAs 11 is connected to a host 2 and exchanges data with the host 2. Each of the CMs 12 is a module that controls RAID. The CPU 21 loads a control program stored in the program memory 26 into the memory 27 and executes the program, thereby controlling the RAID device 101. The cache memory 22 temporarily stores data that is to be written to one of the disks 13 or data that has been read from one of the disks 13. The CM-CM transferring unit 24 exchanges data with other CMs 12. The RAID device 101 employs a RAID 6 configuration in which two parity disks are provided for four data disks.

Next, a write operation in the existing RAID device will be described.

Figure 2:
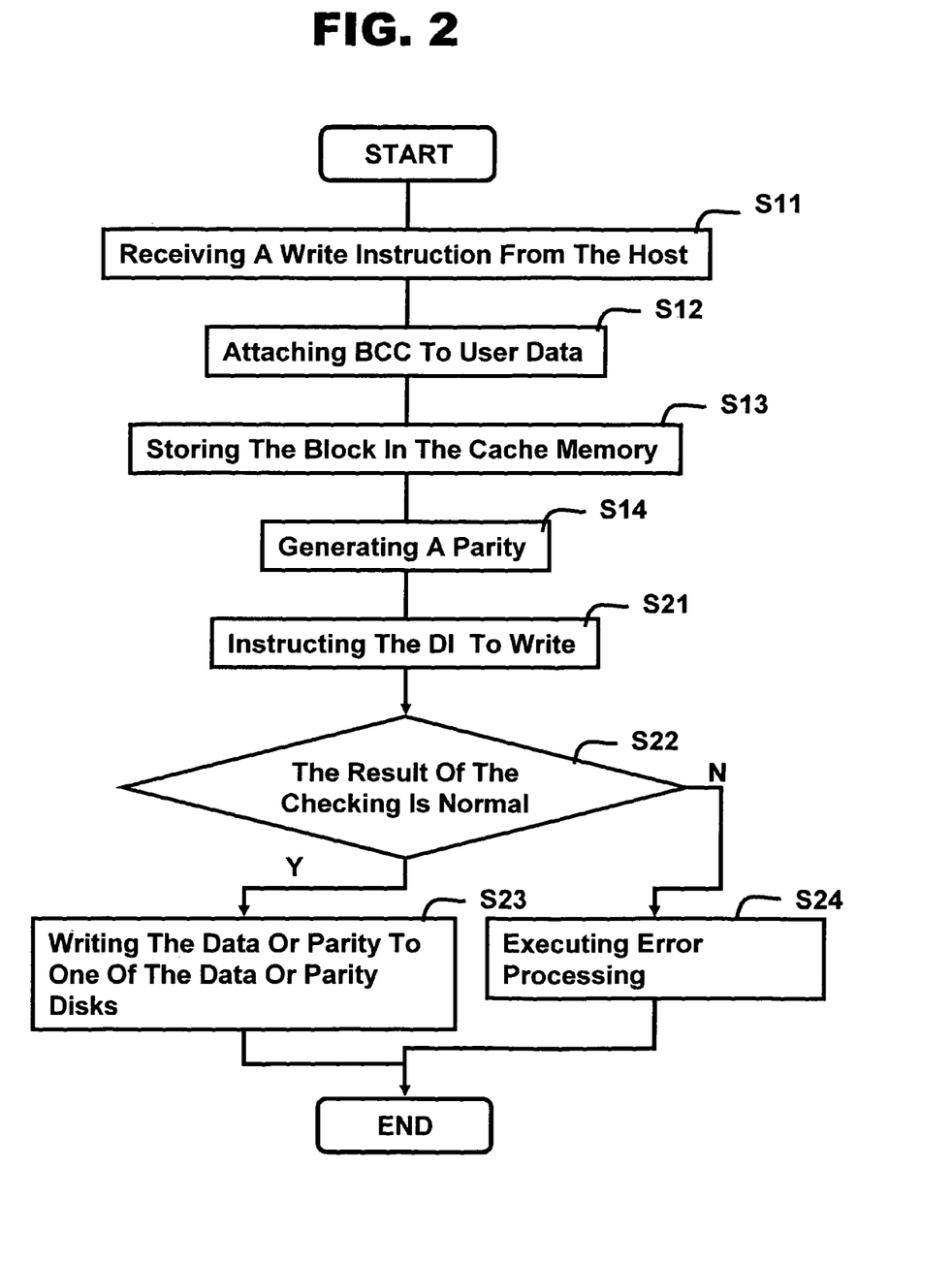
FIG. 2 is a flowchart showing an example of a write operation according to an existing method.

FIG. 2 is a flowchart showing an example of a write operation in the existing RAID device 101. When one of the CAs 11 has received a write instruction from the host (S11), the CA 11 attaches a block check code (BCC) to each piece of 512-byte user data, thereby forming a block (S12), and stores the block in the cache memory 22 (S13).

Then, asynchronously with the write instruction from the host, the CPU 21 executes a parity generating process to generate a parity from the data stored in the cache memory 22 (S14), and instructs the DI 23 to write the data and the parity (S21). The DI 23 checks the BCC regarding the data or parity that is to be written according to the instruction (S22). If the result of the checking is normal (Y in S22), the DI 23 writes the data or parity to one of the data or parity disks 13 (S23). The flow then comes to an end. On the other hand, if the result of the checking is not normal (N in S22), the DI 23 does not write the data or parity to any of the disks 13. Then, the CPU 21 executes error processing, such as reporting the error to the host 2 (S24) The flow then comes to an end.

Next, the BCC will be described.

Figure 3:
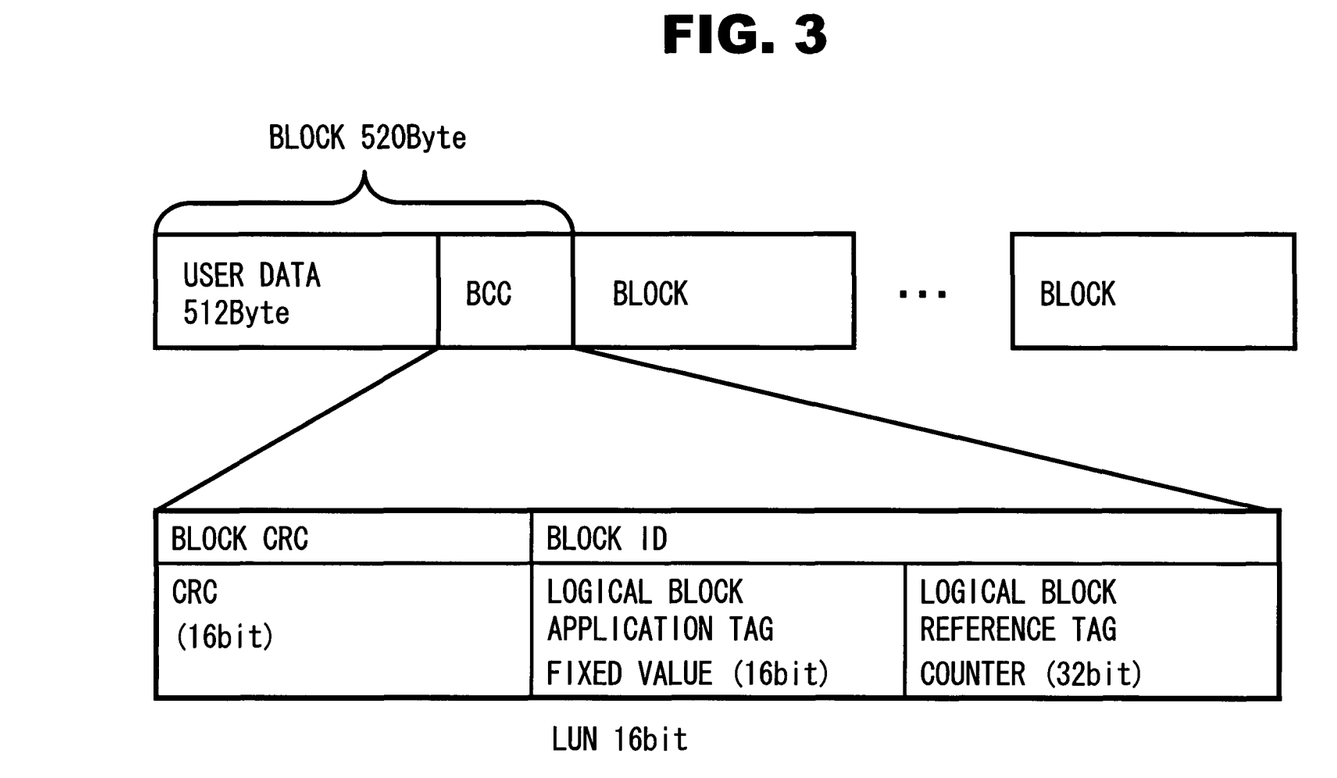
FIG. 3 is a diagram showing an example format of BCC.

FIG. 3 is a diagram showing an example of the format of BCC. The CA 11 attaches a BCC to each piece of 512-byte user data (unit data) to form a block. The BCC includes a 16-bit block CRC (Cyclic Redundancy Check) code and a 48-bit block ID. The CRC code is a code for verifying the validity of user data. The block ID is a code for verifying the validity of the storage location, etc. of the user data.

The block ID includes a 16-bit logical block application tag and a 32-bit logical block reference tag. The logical block application tag represents a fixed value independent of the storage location of the block. The logical block reference tag represents a counter (location information) indicating the storage location of the block. The fixed value is a 16-bit logical unit number (LUN). Alternatively, the field of the fixed value may be shared with information other than the LUN.

As well as a case where the DI 23 writes data from the memory 22 to one of the disks 13, the BCC is checked also in a case where the DI 23 reads data from one of the disks 13 into the cache memory 22, in a case where the CA 11 sends data from the cache memory 22 to the host 2, and in a case where the CM-CM 24 sends data from the cache memory 22 of the own CM 12 to the cache memory 22 of another CM 12. By assuring the validity of data through the checking of BCC as described above, RAID reliability is improved. Furthermore, by checking the counter indicating the storage location, it is possible to prevent writing data at an incorrect storage location on the disk 13.

Next, a one-dimensional redundancy scheme of RAID 6 will be described.

Figure 4:
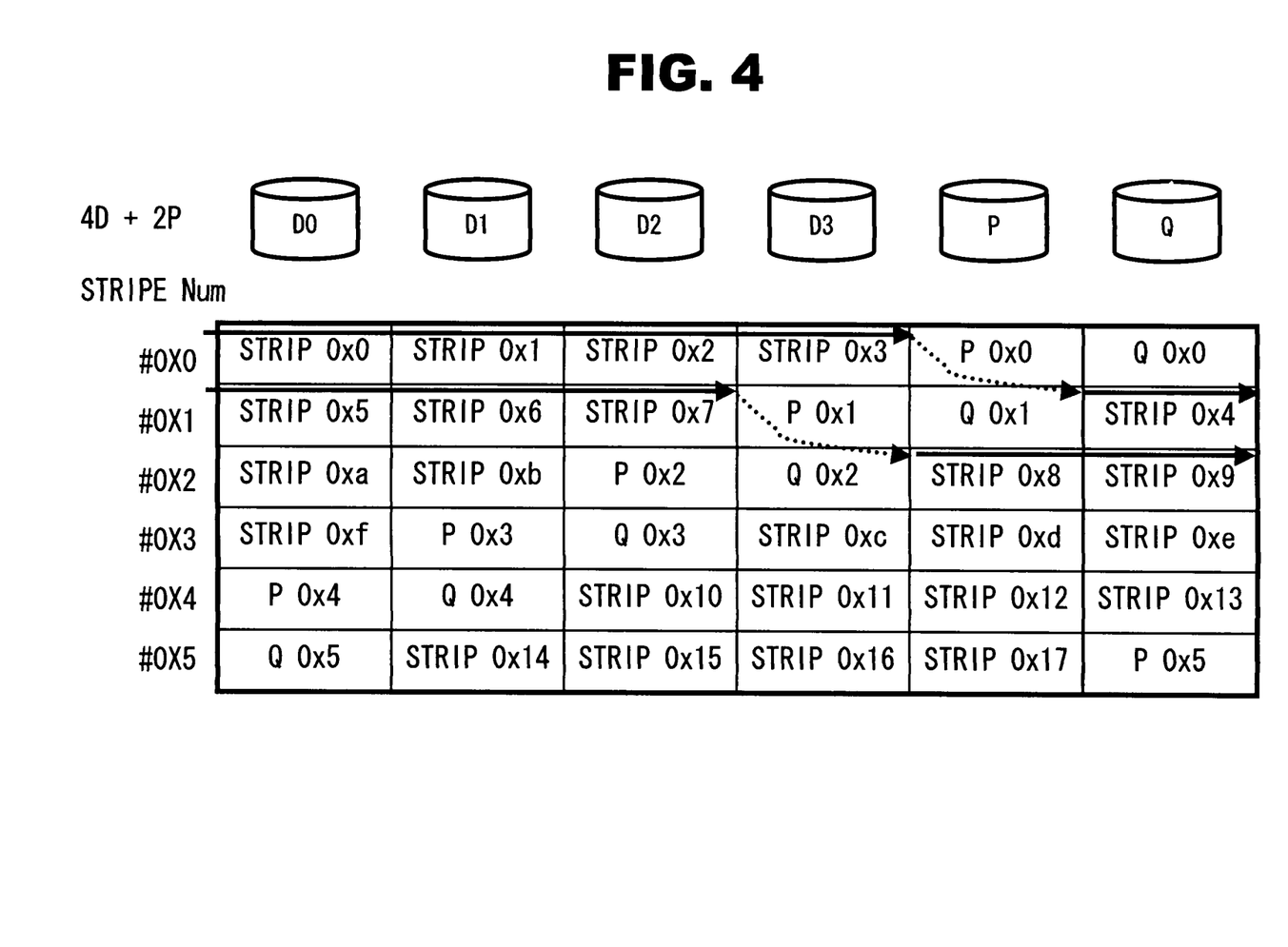
FIG. 4 is a diagram showing an example of strip distribution in a one-dimensional redundancy scheme of RAID 6.

FIG. 4 is a diagram showing an example of strip distribution in a one-dimensional redundancy scheme of RAID 6. The RAID device 101 includes six disks D0, D1, D2, D3, P, and Q, of which the four disks D0, D1, D2, and D3 are used for data and the two disks P and Q are used for parities. Each set of successive 0x80 blocks forms a strip (data group), and sets of successive 0x80 blocks at corresponding locations on the six disks form a stripe. Each stripe has a stripe number assigned thereto, and strip numbers are assigned serially to strips in which data is written. Furthermore, in each stripe, a parity P and a parity Q each having the same size as one strip is generated from four strips. The parity P and the parity Q are generated in mutually different manners.

FIG. 4 shows locations of strips with strip numbers 0x0 to 0x17 in stripes with stripe numbers 0x0 to 0x6. In the stripe with the stripe number 0x0, strip numbers are assigned in order of drives (the disks D0, D1, D2, and D3). In subsequent stripes, the locations of strips are determined cyclically in order of drive numbers on a stripe-by-stripe basis. That is, as indicated by arrows in FIG. 4, in the stripe with the stripe number 0x1, strip numbers are assigned in order of the disks Q, D0, D1, and D2, and in the stripe with the stripe number 0x2, strip numbers are assigned in order of the disks P, Q, D0, and D1. In this manner, the CPU 21 distributes the strips, the parity P, and the parity Q to the six disks.

Figure 5:
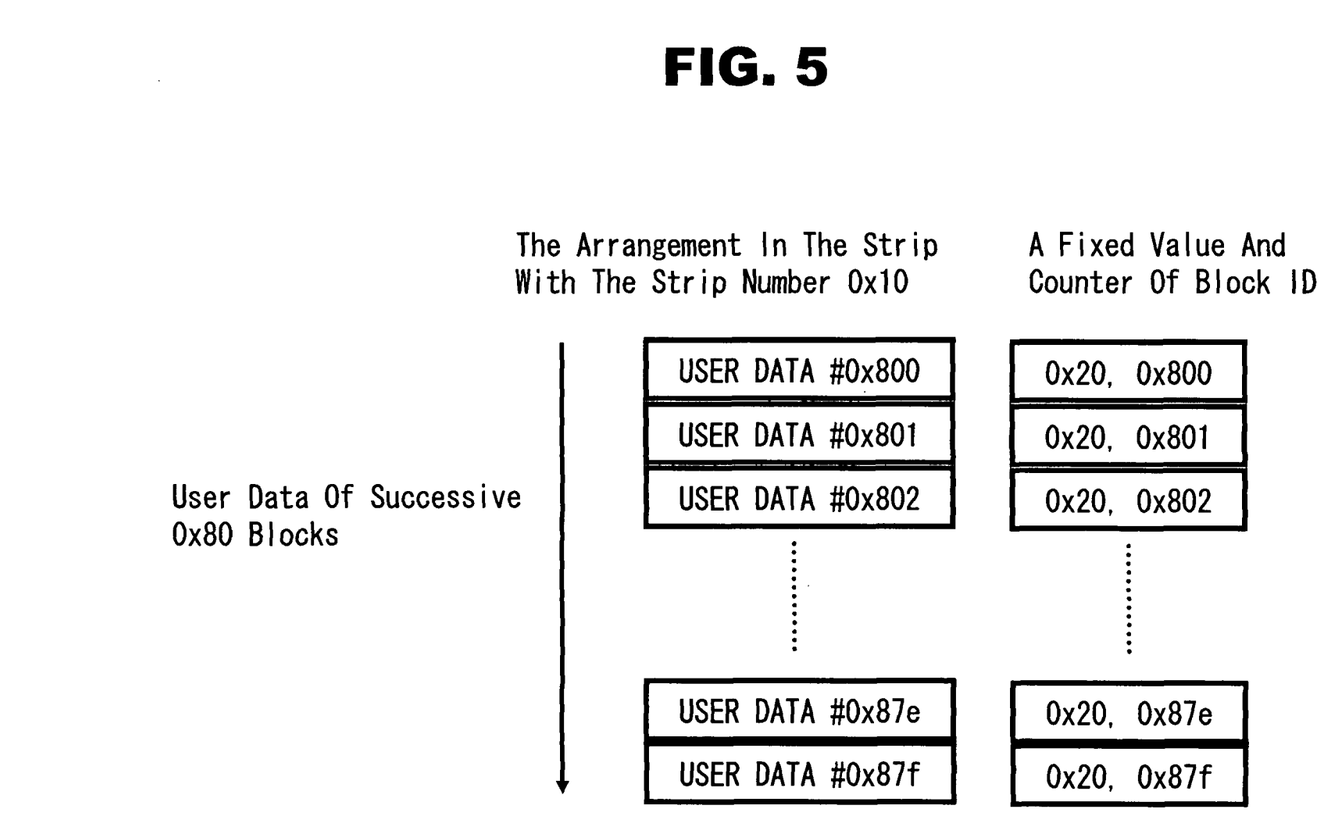
FIG. 5 is a diagram showing an example of content of blocks in a strip.

FIG. 5 is a diagram showing an example of the content of blocks in a strip. Of the strips shown in FIG. 4, FIG. 5 shows the arrangement of user data and block IDs in the strip with the strip number 0x10. In this strip, user data of successive 0x80 blocks is arranged, and a fixed value and counter of block ID are arranged for each of the blocks. The fixed value is common among all the blocks. On the other hand, the counter is a block number that is assigned sequentially. Furthermore, in two strips having successive strip numbers i1 and i2, the counter of the last block of the strip with the strip number i1 is immediately followed by the counter of the first block of the strip with the strip number i2. The CPU 21 arranges blocks in the strip in the manner described above.

As described above, the counter in the existing RAID device 101 represents sequential values. Thus, for example, regarding a write instruction involving a plurality of successive blocks, the DI 23 can readily predict the counter values of subsequent blocks from the counter value of the beginning block of the strip. Accordingly, the DI 23 can readily and quickly check the counter.

When the one-dimensional redundancy scheme of RAID 6 is employed, the parity P is calculated by XORing all the strips in a stripe. The parity Q is calculated by weighting all the strips in a stripe by multiplication in a Galois field and XORing the results.

Since the counter values of the parities P and Q are calculated similarly to the counter values of user data, the counter values do not become sequential. Thus, the DI 23 in the existing RAID device 101 is not able to check the BCC quickly.

Embodiments of the present disclosure has been made in order to overcome the problem described above, and it is an object thereof to provide a storage controlling device and storage controlling method that readily allows checking of two types of parity.

In order to overcome the problem described above, according to an embodiment of the present disclosure, there is provided a storage controlling device that generates first parities and second parities on the basis of data by mutually different generating methods. The storage controlling device includes an obtaining unit that obtains a plurality of pieces of unit data having a predetermined size; an attaching unit that attaches location information to each of the plurality of pieces of unit data, the location information indicating a storage location of the piece of unit data; a first generating unit that generates m successive first parities on the basis of n pieces of successive data, each of the n pieces of successive data being composed of m successive pieces of unit data, and that generates location information of the m successive first parities on the basis of location information of the n pieces of successive data and a first parameter that is set; and a second generating unit that generates m successive second parities on the basis of the n pieces of successive data and n weight constants that are set, and that generates location information of the m successive second parities on the basis of the location information of the n pieces of successive data, the n weight constants, and a second parameter that is set.

According to another embodiment of the present disclosure, there is provided a storage controlling method that generates first parities and second parities on the basis of data by mutually different generating methods. The storage controlling method includes an obtaining step of obtaining a plurality of pieces of unit data having a predetermined size; an attaching step of attaching location information to each of the plurality of pieces of unit data, the location information indicating a storage location of the piece of unit data; a first generating step of generating m successive first parities on the basis of n pieces of successive data, each of the n pieces of successive data being composed of m successive pieces of unit data, and generating location information of the m successive first parities on the basis of location information of the n pieces of successive data and a first parameter that is set; and a second generating step of generating m successive second parities on the basis of the n pieces of successive data and n weight constants that are set, and generating location information of the m successive second parities on the basis of the location information of the n pieces of successive data, the n weight constants, and a second parameter that is set.

According to these embodiments, two types of parity can be readily checked.

Now, an embodiment of the present disclosure will be described with reference to the drawings.

Now, the principles of an existing parity generating method and a parity generating method according to this embodiment will be described.

This embodiment will be described in the context of an example of a RAID 6 storage control device with (n+2) member disks including n disks as data areas and 2 disks as parity areas.

When a stripe is selected as a subject stripe, strip numbers i (i=0 to n−1) within the stripe are assigned to strips in the subject stripe in order of strip numbers. Furthermore, the first strip (i=0) in the subject stripe is defined as the beginning strip. A counter Bi of each of the blocks in the strip with the strip number i within the stripe can be expressed by equation (1) below:

$$Bi = Ti + S \qquad (1)$$

Ti denotes the value of the counter of the beginning block of the strip, which is a fixed value within the strip. S denotes a sequential number assigned to each block in the strip. The values of S of blocks at corresponding locations of mutually different strips are the same. In the strip with the strip number i within the stripe, assuming that the number of blocks in the strip is 0x80, Ti is 0x0080, and S takes on values of 0x00 to 0x7f for the individual blocks, the counter Bi takes on sequential values of 0x0080 to 0x00ff for the individual blocks.

First, a method of generating a parity P will be described.

In this embodiment, the operator "+" denotes XOR, and the operator "·" denotes multiplication in a Galois field. The operator "+" usually denotes ADD. However, when the strip size is 2N and Ti representing the beginning counter of each strip is an integer multiple of the strip size, the bit positions of Ti representing the counter in bits do not overlap the bit positions of S, so that the following equation (2) holds:

$$Ti\ ADD\ S = Ti\ XOR\ S \tag{2}$$

Letting Di denote data of the strip with the strip number i within the stripe, data Dp of a parity P that is generated can be expressed by equation (3) below:

$$D_p = D_0 + D_1 + \ldots + D_{n-1} \tag{3}$$
$$= \sum_{i=0}^{n-1} D_i$$

Now, a counter obtained by the existing method of generating a parity P will be described.

A counter is calculated similarly to data, and a counter Bp of the parity P, generated by the existing method, can be expressed by equation (4) below:

$$B_p = B_0 + B_1 + \ldots + B_{n-1} \tag{4}$$
$$= \sum_{i=0}^{n-1} B_i$$
$$= \sum_{i=0}^{n-1} (T_i + S)$$
$$= \sum_{i=0}^{n-1} T_i + \sum_{i=0}^{n-1} S$$

The first term is a constant. When n is an odd number, the second term takes on sequential values S. When n is an even number, the second term is a constant 0x00. Thus, when n is an even number, Bp is a constant value instead of taking on sequential values, so that checking by the DI 23 is not allowed.

Next, a method of generating a parity Q will be described.

The operation in the Galois field GF(2N), used to generate a parity Q, satisfies the distributive law expressed by equation (5) below:

$$X \cdot (Y+Z) = (X \cdot Y) + (X \cdot Z) \tag{5}$$

Letting Di denote data of the strip with the strip number i within the stripe, and Ai denote a predetermined weight constant associated with the strip number i within the stripe, data Dq of a parity Q that is generated can be expressed by equation (6) below:

$$D_q = A_0 \cdot D_0 + A_1 \cdot D_1 + \ldots + A_{n-1} \cdot D_{n-1} \tag{6}$$
$$= \sum_{i=0}^{n-1} (A_i \cdot D_i)$$

Ai takes on different values for individual values of i. As described above, as a method different from the method of generating a parity P, values of Ai for the individual strips in the subject stripe are weighted by multiplication in the Galois field and the results are XORed together, thereby obtaining data of a parity Q.

Now, a counter obtained by the existing method of generating a parity Q will be described.

Since a counter is calculated similarly to data, using the counter Bi of the strip with the strip number i within the stripe and the weight constant Ai associated with the strip number i within the stripe, a counter Bq of the parity Q, generated by the existing method, can be expressed by equation (7) below:

$$B_q = A_0 \cdot B_0 + A_1 \cdot B_1 + \ldots + A_{n-1} \cdot B_{n-1} \tag{7}$$
$$= \sum_{i=0}^{n-1} (A_i \cdot B_i)$$
$$= \sum_{i=0}^{n-1} (A_i \cdot (T_i + S))$$
$$= \sum_{i=0}^{n-1} (A_i \cdot T_i) + \sum_{i=0}^{n-1} (A_i \cdot S)$$

The first term is a constant. The second term takes on various values depending on Ai and n. Thus, Bq does not take on sequential values, so that checking by the DI 23 is not allowed.

In this embodiment, when a parity P or Q is generated, in addition to N strips representing user data, a phantom strip, which is an imaginary strip having fixed data recorded therein, is XORed. The phantom strip does not reside on any disk, and is included in processing for generating a parity or restoring data by the CPU 21. Thus, the phantom strip can be set or changed in accordance with the number of member disks in a RAID group or the type of parity (P or Q) that is generated. Furthermore, the data portions of the phantom strip in this embodiment are all set to 0. Thus, even if the phantom strip is XORed with a parity P or Q generated by the existing method, the data of the parity P or Q generated remains the same. On the other hand, the counter of the phantom strip is set in accordance with the situation, so that the counter of the parity P or Q generated according to this embodiment differs from that generated by the existing method.

Next, a method of generating a counter of a parity P according to this embodiment will be described.

Now, a counter Bphp of a phantom strip, used for generating a parity P, will be defined. When n is an even number, Bphp is defined by equation (8) below:

$$B_{php} = T_0 + S \tag{8}$$

Furthermore, a counter Bp' of a parity P, generated by reflecting the phantom strip on Bp, can be expressed by equation (9) below:

$$B'_p = B_p + B_{php} \tag{9}$$
$$= \sum_{i=0}^{n-1} T_i + \sum_{i=0}^{n-1} S + T_0 + S$$

$$= \sum_{i=1}^{n-1} T_i + \sum_{i=1}^{n-1} S$$

$$= \sum_{i=1}^{n-1} T_i + S$$

The first term is a constant, and the second term takes on sequential values S. Thus, Bp' takes on sequential values within the strip, so that checking by the DI 23 is allowed.

When n is an odd number, Bphp is defined by equation (10) below:

$$B_{php} = T_0 \quad (10)$$

Furthermore, a counter Bp' of a parity P, generated by XORing the phantom strip with Bp generated similarly to the existing method, can be expressed by equation (11) below:

$$B'_p = B_p + B_{php} \quad (11)$$

$$= \sum_{i=0}^{n-1} T_i + \sum_{i=0}^{n-1} S + T_0$$

$$= \sum_{i=1}^{n-1} T_i + \sum_{i=1}^{n-1} S$$

$$= \sum_{i=1}^{n-1} T_i + S$$

The first term is a constant, and the second term takes on sequential values S. Thus, Bp' takes on sequential values within the strip, so that checking by the DI 23 is allowed.

Next, a method of generating a counter of a parity Q according to this embodiment will be described.

Of the weight constants Ai, assuming that the weight constant A0 for the beginning strip is 1, since 1·X=X, Bq can be defined by equation (12) below:

$$B_q = A_0 \cdot B_0 + A_i \cdot B_1 + \ldots + A_{n-1} \cdot B_{n-1} \quad (12)$$

$$= B_0 + \sum_{i=1}^{n-1} (A_i \cdot B_i)$$

$$= B_0 + \sum_{i=1}^{n-1} (A_i \cdot (T_i + S))$$

$$= B_0 + \sum_{i=1}^{n-1} (A_i \cdot T_i) + \sum_{i=1}^{n-1} (A_i \cdot S)$$

$$= B_0 + \sum_{i=1}^{n-1} (A_i \cdot T_i) + \left(\sum_{i=1}^{n-1} A_i\right) \cdot S.$$

Now, let the counter Bphp of the phantom strip used to generate a parity Q be defined by equation (13) below:

$$B_{phq} = B_{phqc} + (A_{phqs} \cdot B_{pbqs}) \quad (13)$$

Bphqc is a constant that is determined for each stripe, corresponding to the second term in equation (12), and Aphqs and Bphqs correspond to the third term in equation (12). Bphqs is a sequential value assigned to each block in the strip, and Aphqs is a weight constant used for Bphqs. Bphqc, Bphqs, and Aphqs can be expressed individually by equations (14) below:

$$B_{phqc} = \sum_{i=1}^{n-1}(A_i \cdot T_i) \quad (14)$$

$$B_{phqs} = S$$

$$A_{phqs} = \sum_{i=1}^{n-1} A_i$$

Furthermore, a counter Bq' of a parity Q, generated by XORing the phantom strip with Bq generated similarly to the existing method, can be expressed by equation (15) below:

$$B'_q = B_q + B_{phq} \quad (15)$$

$$= B_q + B_{phqc} + (A_{phqs} \cdot B_{phqs})$$

$$= B_0 + \sum_{i=1}^{n-1}(A_i \cdot T_i) + \left(\sum_{i=1}^{n-1} A_i\right) \cdot S + B_{phqc} + (A_{phqs} \cdot B_{phqs})$$

$$= B_0$$

$$= T_0 + S$$

As described above, the counter Bq' coincides the counter B0 of the beginning strip, and takes on sequential values, so that checking by the DI 23 is allowed.

Next, the configuration of a RAID device according to this embodiment will be described.

Figure 6:
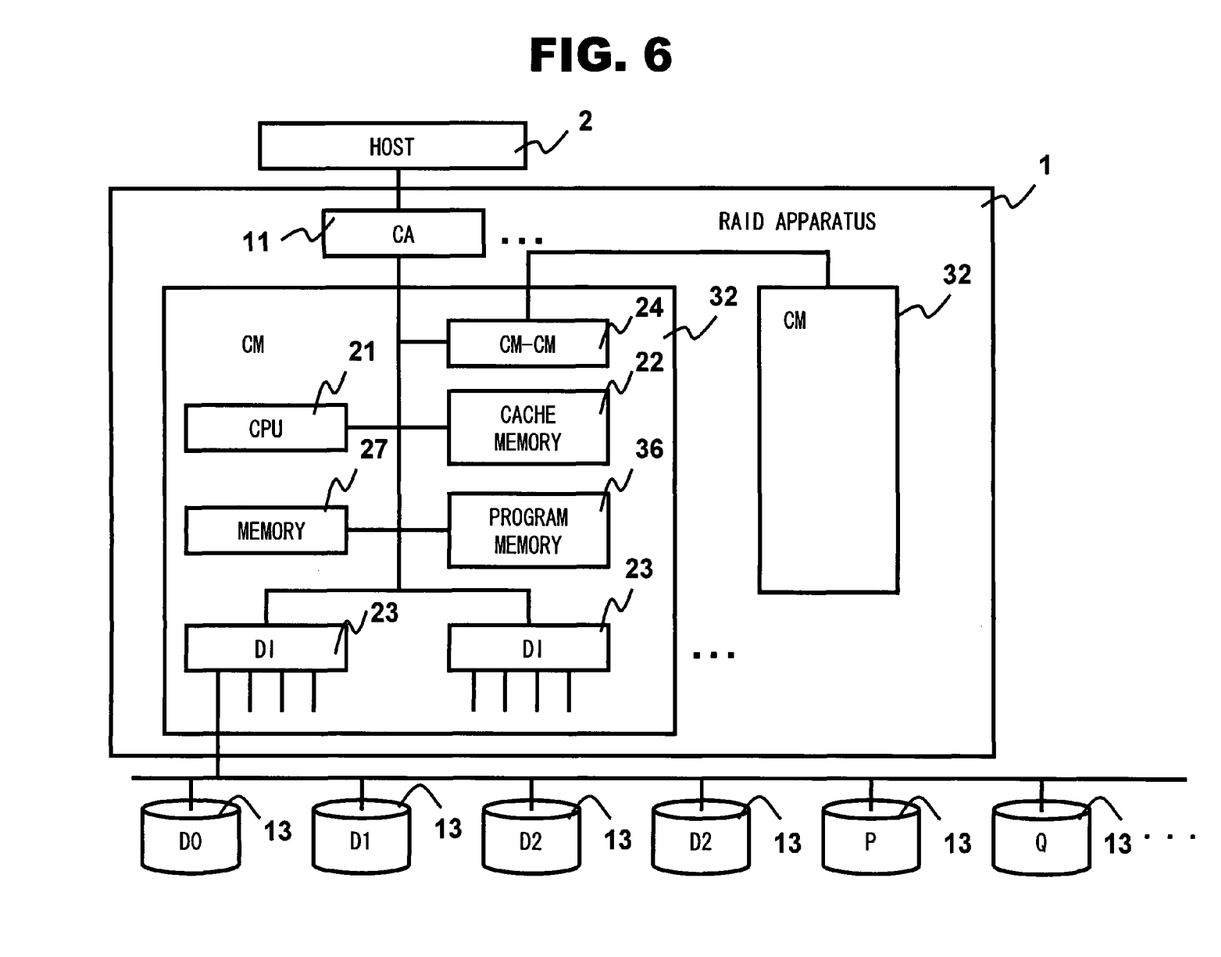
FIG. 6 is a block diagram showing an example configuration of a RAID device according to an embodiment of the present disclosure.

FIG. 6 is a block diagram showing an example configuration of a RAID device according to this embodiment. In FIG. 6, parts that are the same as or similar to parts shown in FIG. 1 are designated by the same numerals, and description of such parts will be omitted. Referring to FIG. 6, compared with the configuration shown in FIG. 1, the RAID system includes a RAID device 1 instead of the RAID device 101. Compared with the RAID device 101, the RAID device 1 includes CMs 32 instead of the CMs 12. Compared with the CMs 12, each of the CMs 32 includes a program memory 36 instead of the program memory 26. Compared with the program memory 26, the program memory 36 stores a different control program. The CPU 21 loads the control program stored in advance in the program memory 36 into the memory 27 and executes the program, thereby controlling the RAID device 1.

Next, a write operation by the RAID device 1 according to this embodiment will be described.

Figure 7:
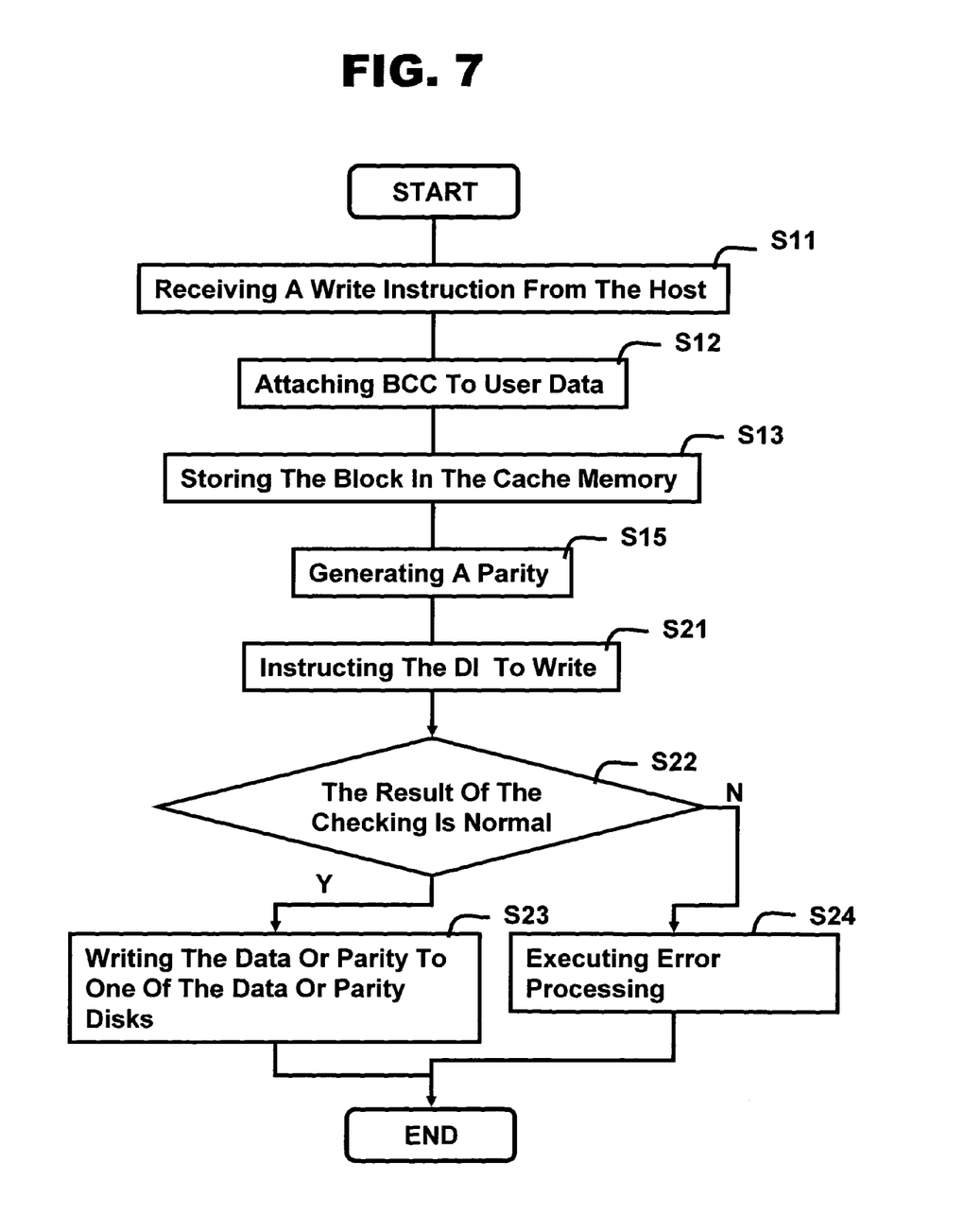
FIG. 7 is a flowchart showing an example of a write operation according to the embodiment.

FIG. 7 is a flowchart showing an example of a write operation according to this embodiment. In FIG. 7, steps that are the same or similar to the steps shown in FIG. 2 are designated by the same numerals, and description of such steps will be omitted. Referring to FIG. 7, compared with FIG. 2, instead of the existing parity generating process (S14), a parity generating process (S15) according to this embodiment is executed.

Next, the parity generating process according to this embodiment will be described.

Figure 8:
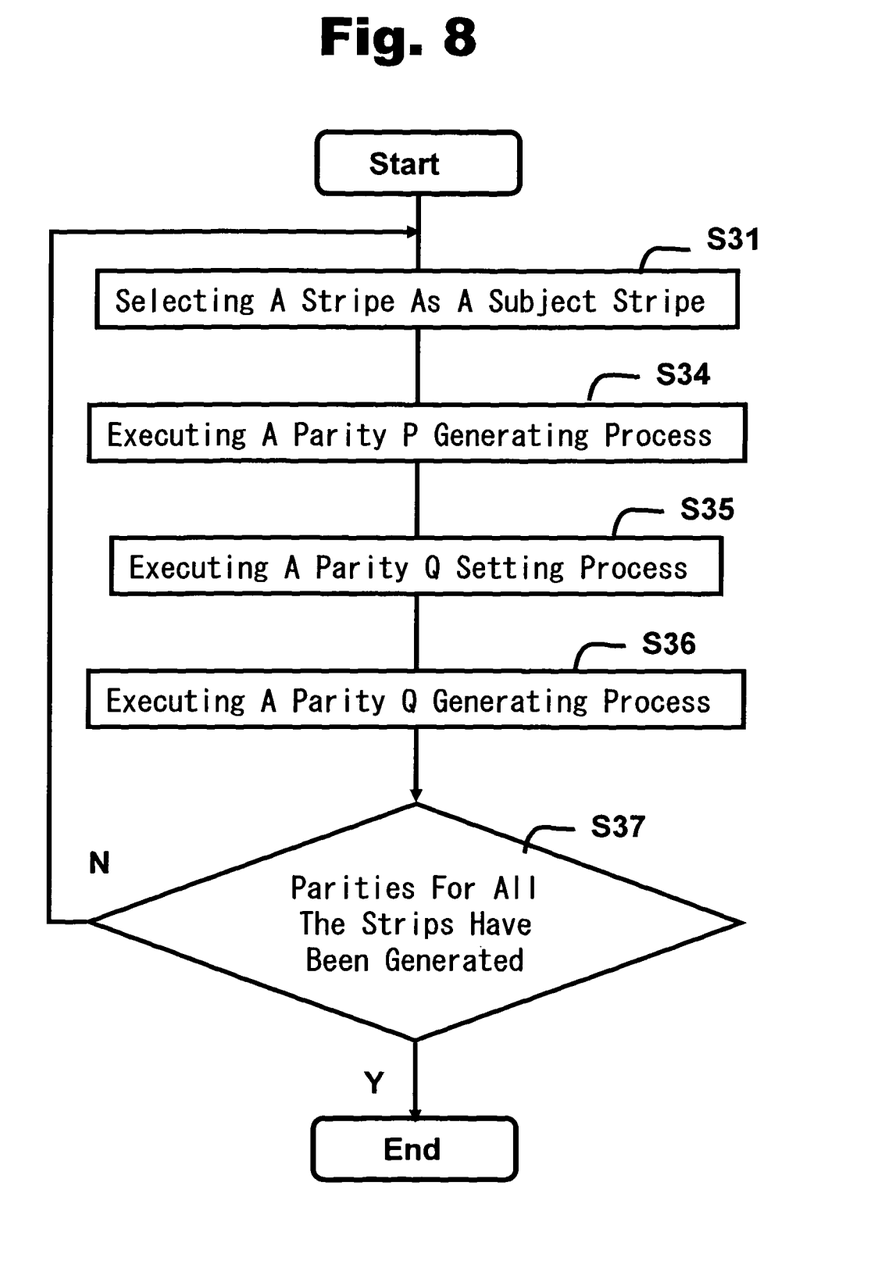
FIG. 8 is a flowchart showing an example of a parity generating process according to the embodiment.

FIG. 8 is a flowchart showing an example of the parity generating process according to this embodiment. The CPU 21 selects a stripe as a subject stripe in order of stripe numbers (S31), executes a parity P generating process (S34) to generate a parity P, executes a parity Q setting process (S35) to set a phantom strip for generating a parity Q, executes a parity Q generating process (S36) to generate a parity Q, and checks whether parities for all the strips have been generated. If parities for all the strips have been generated (Y in S37), the flow comes to an end. On the other hand, if parities for all the strips have not been generated (N in S37), the flow returns to step S31, in which a next subject stripe is selected.

When a RAID configuration has been determined as preparation for a parity generating process, the CPU 21 sets a counter Bphp of the phantom strip for generating a parity P on the basis of the number of data disks n. When n is an even number, the CPU 21 sets Bphp according to equation (8), and when n is an odd number, the CPU 21 sets Bphp according to equation (10). Furthermore, the CPU 21 sets a parameter Aphqs of the phantom strip for generating a parity Q on the basis of the number of data disks n and the weight constant Ai for generating a parity Q according to equation (14). The data of the phantom strip is all 0s.

Furthermore, in the parity P generating process, the CPU 21 XORs the n strips in the subject stripe and the phantom strip, thereby generating a strip of a parity P.

Furthermore, in the parity Q setting process, the CPU 21 sets a parameter Bphqc according to equation (14), which is a constant determined for each strip and is used as a counter of the phantom strip for generating a parity Q, and sets a counter Bphq according to equation (10), which is a counter of the phantom strip for generating a parity Q.

Furthermore, in the parity Q generating process, the CPU 21 weights the n strips in the subject stripe using the weight constants Ai by multiplication in the Galois field, and XORs the weighted n strips and the phantom strip, thereby generating a strip of a parity Q.

According to the parity P generating process described above, by generating a parity P using n strips and a phantom strip having an adjusted counter, the counter of the parity P constantly takes on sequential values, so that checking by the DI 23 is allowed.

According to the parity Q generating process described above, by generating a parity Q using n strips, weight constants Ai, and a phantom strip having an adjusted counter, the counter of the parity Q constantly takes on sequential values, so that checking by the DI 23 is allowed.

According to this embodiment, in a one-dimensional redundancy scheme of RAID 6, checking by the DI 23 is allowed for all the strips of data and parities P and Q. Thus, it is possible to construct a RAID device with a high operation speed and high reliability.

A "first parameter" corresponds to Bphp in the embodiment, and a "second parameter" corresponds to Bphq in the embodiment.

An "obtaining unit" and an "attaching unit" correspond to a CA in the embodiment. A "first generating unit" executes processing corresponding to the parity P generating process by the CPU 21 in the embodiment. A "second generating unit" corresponds to the parity Q generating process by the CPU 21 in the embodiment. A "writing unit" corresponds to a DI in the embodiment.

An "obtaining step" corresponds to step S11 in the embodiment. An "attaching step" corresponds to step S12 in the embodiment. A "first generating step" corresponds to step S34 in the embodiment. A "second generating step" corresponds to step S36 in the embodiment. A "writing step" corresponds to steps S22 and S23 in the embodiment.

The RAID device 1 according to this embodiment can be readily applied to an information processing apparatus to improve the performance of the information processing apparatus. Examples of storage device include a personal computer (PC) and a network attached storage (NAS).

What is claimed is:

1. A method of storing stripe information having user data with first and second parity data to enable correction of the user data in a storage apparatus including a plurality of disk units, the method comprising:
    distributing the stripe information to n successive data strips and first and second parity data strips, each of the data strips being stored in respective disk units and having a plurality of data blocks, each of the data blocks storing a part of either the user data or associated parity data and position information indicative of a location of each of the data blocks;
    obtaining the user data, dividing the user data into a plurality of user data blocks which are adapted to be stored in the data blocks, and determining which user data blocks are to be stored into which data blocks, respectively;
    determining position information of each of the data blocks to store the user data blocks;
    setting a first virtual strip used in the generation of first parity data so the first virtual strip is not residing within the plurality of disk units, the first virtual strip including first virtual position information having a first parameter given;
    generating m successive first parity data for a group of user data blocks of the n successive data strips where one of the n successive data strips comprises m successive user data blocks;
    generating first associated position information for the m successive first parity data, based on the first parameter given, and associated position information corresponding to the n successive data strips;
    setting a second virtual data strip used in the generation of second parity data so the second virtual data strip is not residing within the plurality of disk units, the second virtual strip including second virtual position information having a second parameter given;
    generating m successive second parity data for the group of user data blocks of the n successive data and n weighting functions given;
    generating second associated position information for the m successive second parity data, based on the associated position information of the n successive data strips, the n weighting functions given, and the second parameter given; and
    storing the stripe information including the n successive data strips, the first parity strip having the generated first associated information and the second parity strip having the generated second associated position information, and
    wherein a counter value used to set the first and second virtual data strips is selectively determined in accordance with a number of disks devices or one of the first and the second parity data generated, respectively.

2. The method as set forth in claim 1, wherein the n weighting functions given are calculated by multiplication in the Galois field.

3. The method as set forth in claim 1, wherein the first parameter includes position information of a beginning data block in a beginning data strip of the n successive data strips.

4. A storage apparatus to store stripe information having user data with first and second parity data to enable correction of the user data, the storage apparatus comprising:
    a plurality of disk units configured to store stripe information, the stripe information being distributed to n successive data strips and first and second parity strips, each of the data strips being stored in respective disk units and having a plurality of data blocks, each of the data blocks storing a part of either the user data or associated parity data and position information indicative of a location of each of the data blocks; and a processor to store data according to a process comprising:
obtaining the user data, dividing the user data into a plurality of user data blocks which are adapted to be stored in the data blocks, and determining which user data blocks are to be stored into which data blocks, respectively, determining position information of each of the data blocks for storing the user data blocks, setting a first virtual strip used in the generation of first parity data so the first virtual strip is not residing within the plurality of disk units, the first virtual strip including first virtual position information having a first parameter given, generating m successive first parity data for a group of user data blocks of the n successive data strips where one of the n successive data strips comprises m successive user data blocks generating first associated position information for the m successive first parity data, based on the first parameter given and associated position information of the n successive data strips, setting a second virtual data strip used in the generation of second parity data so the second virtual data strip is not residing within the plurality of disk units, the second virtual strip including second virtual position information having a second parameter given, generating m successive second parity data for the group of user data blocks of the n successive data strips and n weighting functions given, generating second associated position information for the m successive second parity data, based on the associated position information of the n successive data strips, the n weighting functions given, and the second parameter given, and storing the stripe information including the n successive data strips, the first parity strip having the generated first associated information and the second parity strip having the generated second associated position information, and wherein a counter value used to set the first and second virtual data strips is selectively determined in accordance with a number of disks devices or one of the first and the second parity data generated, respectively.

5. The storage apparatus according to claim 4, wherein the n weighting functions given are calculated by multiplication in the Galois field.

6. The storage apparatus according to claim 4, wherein the first parameter given includes position information of a beginning data block in a beginning data strip of the n successive data strips.

7. A method storing user data with parity data to enable correction of the user data in a storage apparatus, the method comprising:
setting a first virtual strip used in a generation of first parity data so the first virtual strip is not residing within the storage apparatus, the first virtual strip including first virtual position information having a first parameter given;

generating first parity data for unit data blocks where one of the unit data blocks comprises a plurality of unit data;

generating first associated position information for the first parity data, based on the first parameter given, and associated position information corresponding to the unit data blocks;

setting a second virtual data strip used in a generation of second parity data so the second virtual data strip is not residing within the storage apparatus, the second virtual strip including second virtual position information having a second parameter given;

generating second parity data for the unit data blocks and weighting functions given; and generating second associated position information for the second parity data, based on the associated position information corresponding to the unit data blocks, the weighting functions, and the second parameter given, and wherein a counter value used to set a first and second virtual data strip is selectively determined in accordance with a number of disks devices or one of the first and the second parity data generated, respectively.

8. A storage apparatus storing user data with parity data to enable correction of the user data, the storage apparatus comprising:
a processor operable to execute:
setting a first virtual strip used in a generation of first parity data so the first virtual strip is not residing within the storage apparatus, the first virtual strip including first virtual position information having a first parameter given;

generating first parity data for unit data blocks where one of the unit data blocks comprises a plurality of unit data;

generating first associated position information for the first parity data, based on the first parameter given and associated position information corresponding to the unit data blocks;

setting a second virtual data strip used in a generation of second parity data so the second virtual data strip is not residing within the storage apparatus, the second virtual strip including second virtual position information having a second parameter given;

generating second parity data for the unit data blocks and weighting functions given; and generating second associated position information for the second parity data, based on the associated position information corresponding to the unit data blocks, the weighting functions, and the second parameter given, and wherein a counter value used to set a first and second virtual data strip is selectively determined in accordance with a number of disks devices or one of the first and the second parity data generated, respectively.

* * * * *

UNITED STATES PATENT AND TRADEMARK OFFICE
CERTIFICATE OF CORRECTION

| | |
|---|---|
| PATENT NO. | : 8,489,976 B2 |
| APPLICATION NO. | : 12/071512 |
| DATED | : July 16, 2013 |
| INVENTOR(S) | : Kazuhiko Ikeuchi et al. |

Page 1 of 1

It is certified that error appears in the above-identified patent and that said Letters Patent is hereby corrected as shown below:

In the Claims:

Line 10, Column 11, In Claim 4, delete "blocks" and insert -- blocks, --, therefor.

Signed and Sealed this
Twenty-ninth Day of October, 2013

Teresa Stanek Rea
*Deputy Director of the United States Patent and Trademark Office*